(12) United States Patent
Campagnolo Guizilini et al.

(10) Patent No.: US 12,717,014 B2
(45) Date of Patent: Aug. 25, 2026

(54) SYSTEMS AND METHODS FOR TRAINING A DEPTH ESTIMATOR TO BE SCALE-AWARE USING WEAK SONAR SUPERVISION

(71) Applicant: Toyota Research Institute, Inc., Los Altos, CA (US)

(72) Inventors: Vitor Campagnolo Guizilini, Santa Clara, CA (US); Edwardo Martinez, Fremont, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 185 days.

(21) Appl. No.: 18/425,370

(22) Filed: Jan. 29, 2024

(65) Prior Publication Data

US 2025/0244454 A1 Jul. 31, 2025

(51) Int. Cl.

*G01S 7/52* (2006.01)
*G01S 15/08* (2006.01)
*G01S 15/89* (2006.01)
*G01S 15/93* (2020.01)

(52) U.S. Cl.

CPC .......... *G01S 7/52004* (2013.01); *G01S 15/89* (2013.01); *G01S 15/08* (2013.01); *G01S 15/93* (2013.01)

(58) Field of Classification Search

None
See application file for complete search history.

(56) References Cited

U.S. PATENT DOCUMENTS

| | | | | |
|---|---|---|---|---|
| 9,201,424 | B1 * | 12/2015 | Ogale | G05D 1/0253 |
| 10,809,376 | B2 * | 10/2020 | Chan | G06V 10/764 |
| 11,107,227 | B1 * | 8/2021 | Gangundi | G06V 10/454 |
| 11,327,156 | B2 * | 5/2022 | Harrison | G01S 13/867 |
| 11,500,063 | B2 * | 11/2022 | Beijbom | G01S 7/4808 |
| 11,754,719 | B2 * | 9/2023 | Gangundi | G01S 17/86 345/424 |
| 12,080,055 | B2 * | 9/2024 | Lin | G06N 3/084 |
| 12,175,703 | B2 * | 12/2024 | Birchfield | G06N 3/0464 |

(Continued)

OTHER PUBLICATIONS

Lo et al. "How much depth information can radar contribute to a depth estimation model?." arXiv preprint arXiv:2202.13220 (2022). 7 pages. Available at https://acrobat.adobe.com/id/urn:aaid:sc:VA6C2:a10d26d0-8fe3-41df-94ed-9cc77ffdf6df.

(Continued)

*Primary Examiner* — Jonathan D Armstrong
(74) *Attorney, Agent, or Firm* — Christopher G. Darrow; Darrow Mustafa, PC

(57) ABSTRACT

Systems and methods described herein relate to training a depth estimator to be scale-aware using weak sonar supervision. In one embodiment, a depth and scale training system trains a self-supervised monocular depth estimation (MDE) network by minimizing a photometric reprojection error between an original target image of a scene and a viewpoint-synthesized image. The depth and scale training system also supervises weakly the training of the MDE network by minimizing a loss computed between a depth image generated by the MDE network and a set of sparse sonar data points collected from the scene to teach the MDE network to estimate metric scale in connection with controlling a robot.

17 Claims, 5 Drawing Sheets

(56) References Cited

U.S. PATENT DOCUMENTS

| | | | | |
|---|---|---|---|---|
| 2014/0042975 | A1* | 2/2014 | Miller | H01M 6/5033 320/137 |
| 2015/0363970 | A1* | 12/2015 | Spinella-Mamo | G06T 17/00 345/420 |
| 2018/0232947 | A1* | 8/2018 | Nehmadi | G01S 7/295 |
| 2020/0082219 | A1* | 3/2020 | Li | G06F 18/2148 |
| 2020/0343985 | A1* | 10/2020 | O'Shea | G06N 3/082 |
| 2020/0357143 | A1* | 11/2020 | Chiu | G06F 18/253 |
| 2020/0393842 | A1* | 12/2020 | Northcutt | G05D 1/0257 |
| 2021/0004646 | A1* | 1/2021 | Guizilini | G06T 7/55 |
| 2021/0004976 | A1* | 1/2021 | Guizilini | G06N 20/00 |
| 2021/0158043 | A1* | 5/2021 | Hou | G06V 10/454 |
| 2021/0329892 | A1* | 10/2021 | Kozachenok | A01K 61/95 |
| 2022/0083792 | A1* | 3/2022 | Naseer | G06T 17/05 |
| 2022/0084230 | A1 | 3/2022 | Guizilini et al. | |
| 2022/0155454 | A1* | 5/2022 | Cambareri | G01S 7/4912 |
| 2022/0335258 | A1* | 10/2022 | Raventos | G06V 10/82 |
| 2023/0125477 | A1* | 4/2023 | Gurumurthy | G06N 3/08 382/103 |
| 2023/0135659 | A1* | 5/2023 | Wu | G06N 3/044 706/21 |
| 2023/0230264 | A1* | 7/2023 | Guizilini | G01S 17/86 382/106 |
| 2023/0306739 | A1* | 9/2023 | Yu | G06V 10/82 |
| 2023/0367989 | A1* | 11/2023 | Yu | G06N 3/0495 |

OTHER PUBLICATIONS

Gasperini et al. "R4Dyn: Exploring radar for self-supervised monocular depth estimation of dynamic scenes." 2021 International Conference on 3D Vision (3DV). IEEE, 2021. Available at https://acrobat.adobe.com/id/urn:aaid:sc:VA6C2:6359bb60-14b2-46ac-93fb-3697a425d97a.

Liu et al. "Deep underwater monocular depth estimation with single-beam echosounder." 2023 IEEE International Conference on Robotics and Automation (ICRA). IEEE, 2023.

Lenser et al. "Visual sonar: Fast obstacle avoidance using monocular vision." Proceedings 2003 IEEE/RSJ International Conference on Intelligent Robots and Systems (IROS 2003)(Cat. No. 03CH37453). vol. 1. IEEE, 2003. 6 pages. Available at https://acrobat.adobe.com/id/urn:aaid:sc:VA6C2:a084136c-5146-4cd1-8d9a-7a09d2fd3e2a.

Xiong et al. "Robust Depth Estimation in Foggy Environments Combining RGB Images and mmWave Radar." 2022 IEEE International Symposium on Multimedia (ISM). IEEE, 2022. 8 pages. https://acrobat.adobe.com/id/urn:aaid:sc:VA6C2:12b06ec4-a44e-4bc8-8ecc-a54408a623df.

* cited by examiner

SYSTEMS AND METHODS FOR TRAINING A DEPTH ESTIMATOR TO BE SCALE-AWARE USING WEAK SONAR SUPERVISION

TECHNICAL FIELD

The subject matter described herein relates in general to robots and, more specifically, to systems and methods for training a depth estimator to be scale-aware using weak sonar supervision.

BACKGROUND

An important aspect of robotics, from autonomous vehicles to factory robots, is estimating depth. A much-researched and increasingly popular alternative to Light Detection and Ranging (LIDAR) for depth estimation is monocular depth estimation (MDE), in which depth (the distance from the camera to an object in the scene) is estimated from a single camera image using a trained machine-learning model. In some implementations, a MDE network is trained in a self-supervised manner to estimate depth, and the resulting trained MDE network is scale-ambiguous. In other words, the trained MDE network is unable to estimate the sizes of objects in the scene and the distances between those objects. This is disadvantageous because many robotics applications require that a robot be scale-aware—capable of estimating metric scale—so the robot can interact effectively with its environment.

SUMMARY

Embodiments of a system for training a depth estimator to be scale-aware using weak sonar supervision are presented herein. In one embodiment, the system comprises a processor and a memory storing machine-readable instructions that, when executed by the processor, cause the processor to train a self-supervised monocular depth estimation (MDE) network by minimizing a photometric reprojection error between an original target image of a scene and a viewpoint-synthesized image. The memory also stores machine-readable instructions that, when executed by the processor, cause the processor to supervise weakly the training of the MDE network by minimizing a loss computed between a depth image generated by the MDE network and a set of sparse sonar data points collected from the scene to teach the MDE network to estimate metric scale in connection with controlling a robot.

Another embodiment is a non-transitory computer-readable medium for training a depth estimator to be scale-aware using weak sonar supervision and storing instructions that, when executed by a processor, cause the processor to train a self-supervised MDE network by minimizing a photometric reprojection error between an original target image of a scene and a viewpoint-synthesized image. The instructions also cause the processor to supervise weakly the training of the MDE network by minimizing a loss computed between a depth image generated by the MDE network and a set of sparse sonar data points collected from the scene to teach the MDE network to estimate metric scale in connection with controlling a robot.

Another embodiment is a method of training a depth estimator to be scale-aware using weak sonar supervision, the method comprising training a self-supervised monocular depth estimation (MDE) network by minimizing a photometric reprojection error between an original target image of a scene and a viewpoint-synthesized image. The method also includes supervising weakly the training of the MDE network by minimizing a loss computed between a depth image generated by the MDE network and a set of sparse sonar data points collected from the scene to teach the MDE network to estimate metric scale in connection with controlling a robot.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1A:
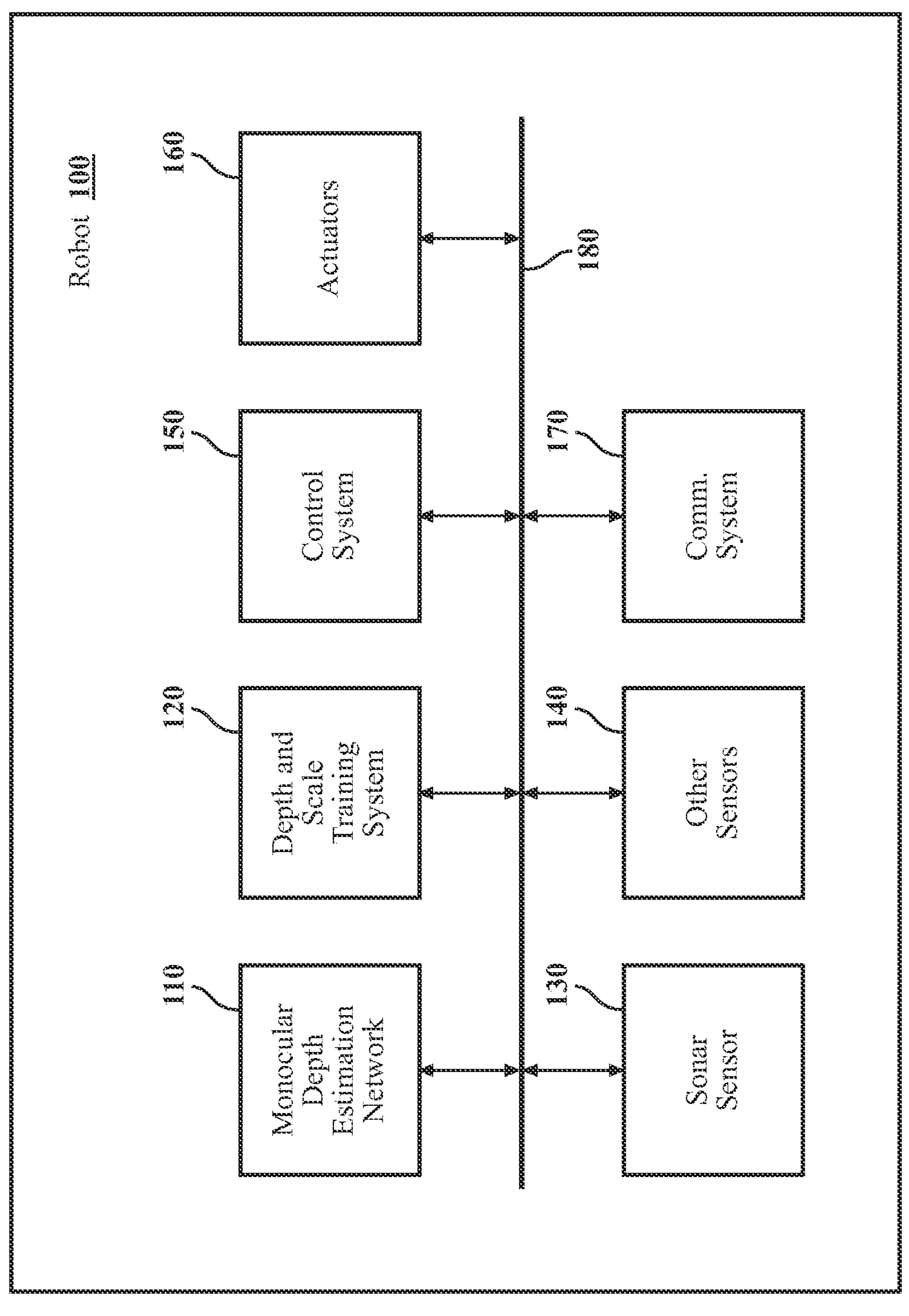
FIGS. 1A and 1B are block diagrams of a robot in which embodiments of systems and methods for training a depth estimator to be scale-aware using weak sonar supervision can be implemented.

Various embodiments described herein of systems and methods for training a depth estimator to be scale-aware using weak sonar supervision overcome the problem of scale-ambiguity in conventional self-supervised monocular-depth-estimation (MDE) networks. Weak sonar supervision is advantageous because many robots (e.g., vehicles) already include sonar sensors, and there exists a large amount of perception data for training MDE networks that includes sonar data. Though sonar data tends to be noisy and sparse compared with image data, sonar nevertheless provides accurate measurements of distance from which metric scale in a scene can be ascertained.

Herein, "sonar" refers to Sound Navigation and Ranging technology. "Metric scale" (sometimes referred to herein as simply "scale") refers to the sizes of objects (e.g., in units such as meters) and the distances (again, e.g., in units of meters) between objects in a scene. In the literature, metric scale is also sometimes referred to as "metric depth."

Estimating metric scale is an important capability for many types of robots. For example, a humanoid indoor or outdoor robot that needs to avoid bumping into objects in the environment needs the ability to estimate scale to navigate and to plan its trajectories successfully. An autonomous vehicle needs to know whether another vehicle it detects in the environment is 20 m away or 2 m away and, in some situations, whether the other vehicle is 4 m long or 6 m long.

In one embodiment, a depth and scale training system trains a self-supervised MDE network by minimizing a photometric reprojection error between an original target image of a scene and a viewpoint-synthesized image. Those skilled in the art will recognize this as self-supervision based on multi-view reprojection. During training, the depth and scale training system weakly supervises the training of the MDE network by minimizing a loss computed between a depth image generated by the MDE network and a set of sparse sonar data points collected from the scene to teach the MDE network to estimate metric scale in connection with controlling a robot. The sonar supervision described herein is referred to as "weak" supervision because the sonar data is sparse compared with the pixels of a depth image produced by the MDE network. For example, in one embodiment, there might be approximately 10 sonar data points that are projected into the image domain as sonar "pixels" for comparison with an equal number of depth pixels among the thousands of depth pixels in a corresponding depth image to calculate the sonar loss discussed above. In general, the term "weak supervision" is used often in the machine-learning literature in contexts different from the various embodiments described herein, and it is a term that is well-known to those skilled in the machine-learning art. In some embodiments, the sonar loss is an absolute-error (L1) loss.

In some embodiments, the set of sparse sonar data points corresponding to a given image frame is obtained from a sonar sensor that is integrated with the robot. In other embodiments, the robot either does not include a sonar sensor or its sonar sensor is not used, and the set of sparse sonar data points corresponding to a given image frame is transmitted to the robot from a source external to the robot, such as an electric-vehicle (EV) charging station or an infrastructure device such as a Roadside Unit (RSU).

In some embodiments, a depth and scale training system in accordance with the principles described herein is integrated with the robot, and the training can take place as the robot is operated in its normal operating environment or in a test environment. In other embodiments, the depth and scale training system is separate from the robot (e.g., in a server or workstation), and the weights of the trained scale-aware MDE network are downloaded to the robot once training has been completed.

The techniques described herein have broad applicability to a variety of different kinds of robots. For example, in some embodiments, the robot is an autonomous vehicle, such as an autonomous car or truck, a delivery robot, a search-and-rescue robot, or an unmanned aerial vehicle (UAV) (aka "drone"). In other embodiments, the robot is an indoor robot, such as a factory (manufacturing) robot or an autonomous humanoid robot. Autonomous humanoid robots include, without limitation, service robots, companionship robots, some types of medical robots, and some types of security robots.

In some embodiments, the scale-aware MDE network includes a U-Net neural network, a well-known neural-network architecture. In other embodiments, the scale-aware MDE network includes a transformer neural network.

Regardless of the type of robot to which the principles herein are applied and the specific architecture of the scale-aware MDE network, once the scale-aware MDE network has been trained, it can be used to, at least in part, control the operation of the robot. For example, in one embodiment, the trained scale-aware MDE network is part of a machine-vision system of the robot that enables the robot to navigate its environment and plan its trajectories, as mentioned above.

Figure 1B:
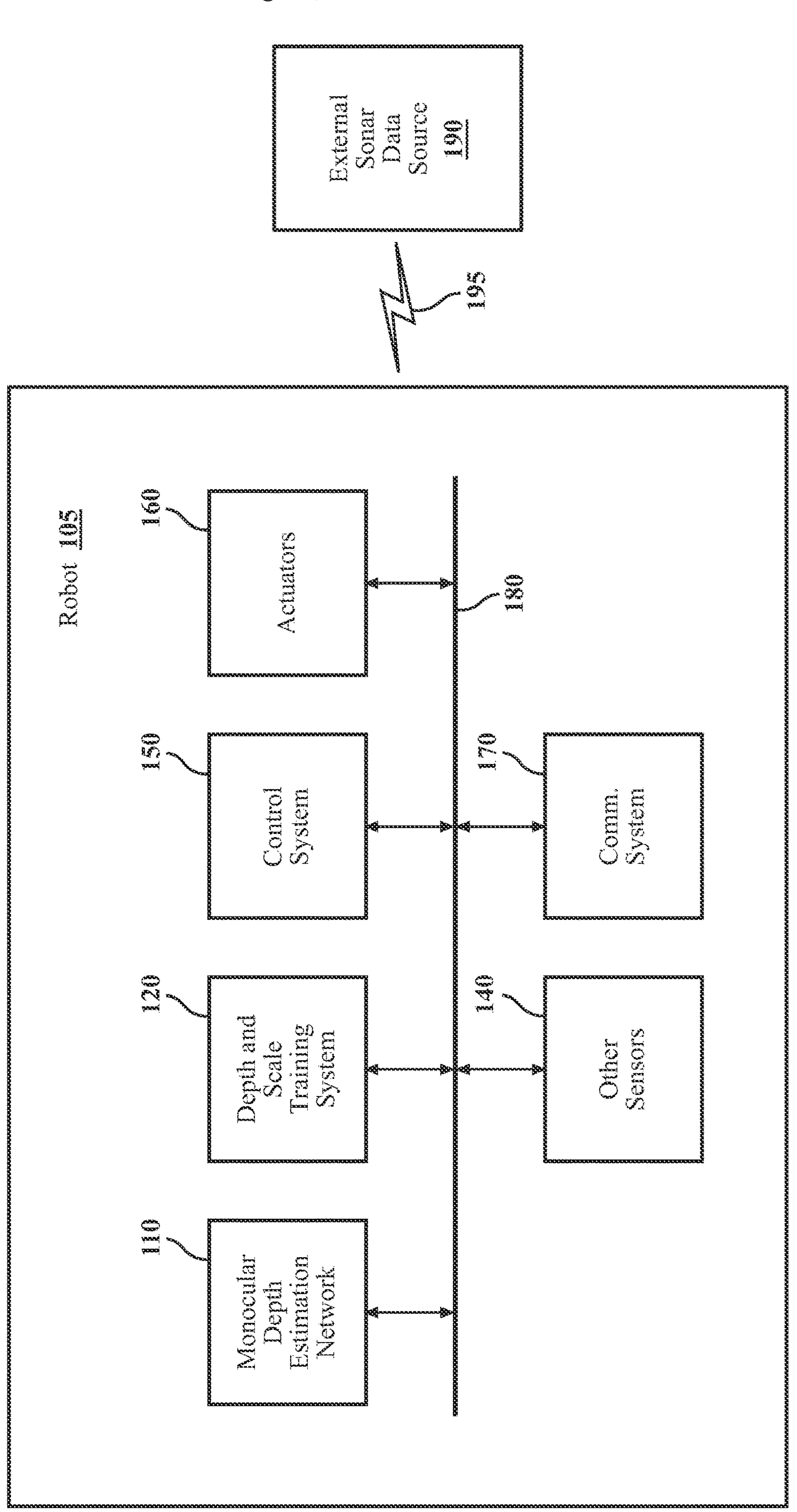

FIGS. 1A and 1B are block diagrams of a robot 100 and a robot 105, respectively, in which embodiments of systems and methods for training a depth estimator to be scale-aware using weak sonar supervision can be implemented. In the embodiment of FIG. 1A, robot 100 includes a MDE network 110. MDE network 110, in some embodiments, includes two functional blocks, an encoder block that accepts an input image and encodes the image into features and a decoder block that decodes the features into a depth image (aka a "depth map"). This involves pixel-to-pixel transformation: three-channel pixels (R, G, and B color) to single-channel pixels (depth).

As discussed above, during training, MDE network 110 is self-supervised, except for weak sonar supervision that renders MDE network 110 scale-aware (i.e., capable of estimating metric scale in a scene) in connection with controlling the operation of a robot (in this embodiment, robot 100). Robot 100 also includes a depth and scale training system 120 that trains MDE network 110 to estimate both depth and metric scale through a process discussed in greater detail below in connection with FIG. 2.

In the embodiment of FIG. 1A, robot 100 includes a sonar sensor 130 (e.g., an active-sonar sensor) and other sensors 140. Other sensors 140 include at least one camera and, in some embodiments, one or more of Light Detection and Ranging (LIDAR) sensors, radar sensors, positioning sensors, and accelerometers. As also shown in FIG. 1A, robot 100 includes a control system 150 and one or more actuators 160 that, in some embodiments, enable robot 100 to move about within its environment and to interact with objects in the environment. In some embodiments, robot 100 includes a communication system 170 by which robot 100 communicates with other robots, cloud servers, infrastructure devices, etc. Within robot 100, the various elements mentioned above can communicate with one another via one or more data buses 180. FIG. 1A is thus an example of an embodiment in which a depth and scale training system 120 for training a MDE network 110 is integrated with a robot 100. As discussed above, in some embodiments depth and scale training system 120 is separate from robot 100 (e.g., in a server or workstation).

In the embodiment of FIG. 1B, robot 105 includes many of the same elements as robot 100 discussed above in connection with FIG. 1A. In this embodiment, however, robot 105 does not include a sonar sensor of its own, or, if it does include a sonar sensor, depth and scale training system 120 does not obtain, from the sonar sensor integrated with robot 105, the sparse sonar data used to supervise the training of MDE network 110 for scale-awareness. Instead, in this embodiment, depth and scale training system 120 obtains the sparse sonar data from an external sonar data source 190 nearby in the environment of robot 105. Examples of an external sonar data source 190 include, without limitation, an EV charging station and an infrastructure device such as a RSU. When robot 105 (e.g., an autonomous vehicle) is near such an external sonar data source 190, external sonar data source 190 transmits the sparse sonar data (e.g., the measured distance from robot 105 to the external sonar data source 190) to robot 105 over a wireless communication link 195 such as IEEE 802.11 (WiFi), Bluetooth®, Bluetooth® Low Energy (Bluetooth® LE), or Dedicated Short-Range Communications (DSRC).

Depth and scale training system 120 incorporates the received sparse sonar data in weakly supervising the training of MDE network 110.

Figure 2:
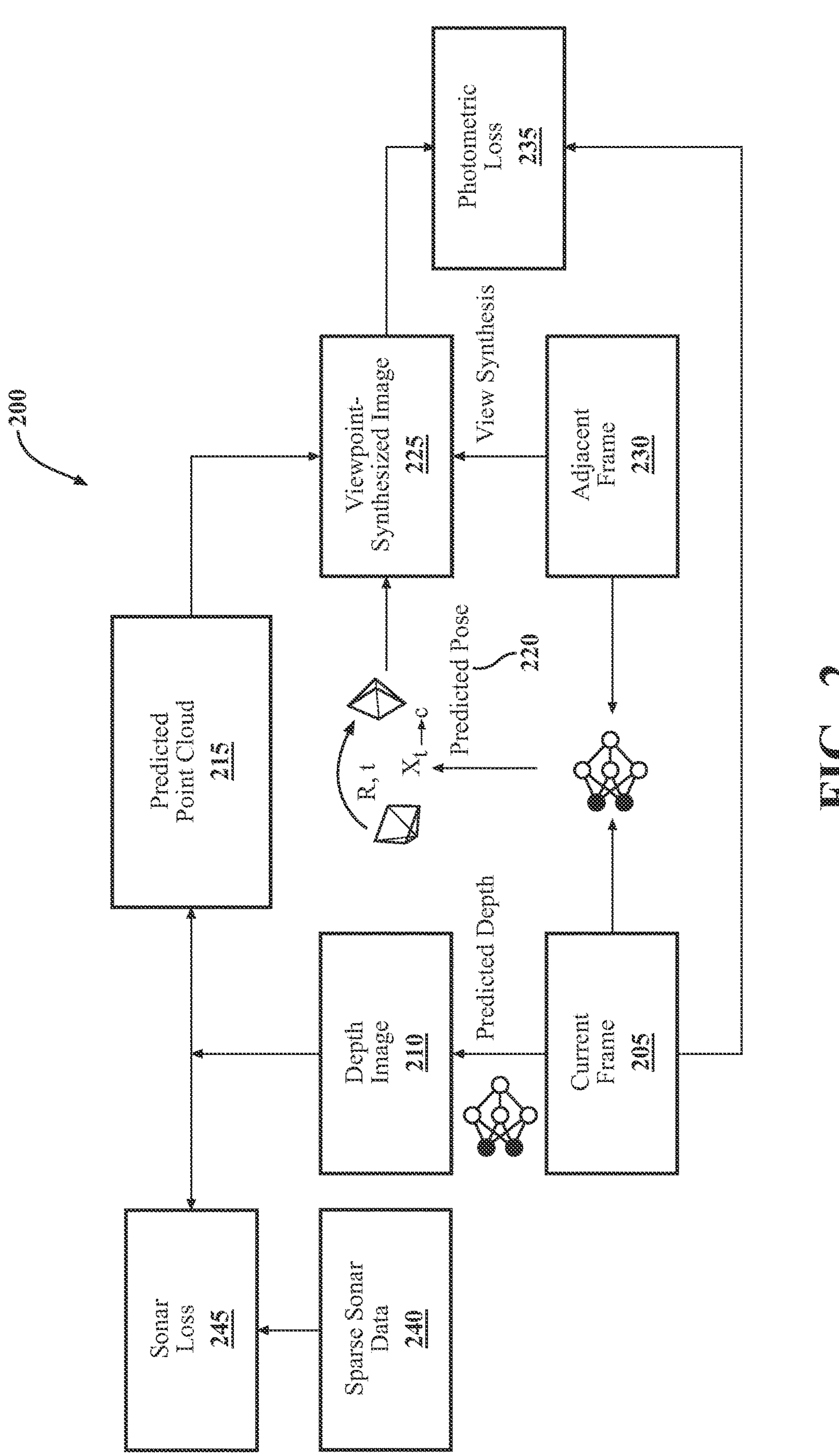
FIG. 2 is a diagram of a training process, in accordance with an illustrative embodiment of the invention.

FIG. 2 is a diagram of a training process 200, in accordance with an illustrative embodiment of the invention. Training process 200 pertains to the training of a MDE network such as MDE network 110 in the embodiments of FIGS. 1A and 1B discussed above. Training process 200 also pertains to an embodiment in which a MDE network is trained separately from a robot and the weights of the trained model are later downloaded to the robot.

In FIG. 2, a MDE network processes a current frame 205 (e.g., an RGB image) to generate a depth image 210. Based on processing current frame 205 and an adjacent frame 230 (e.g., using a pose network), a predicted pose 220 is generated. A predicted point cloud 215 in three-dimensional (3D) space is generated based on depth image 210. Given the predicted point cloud 215 and the predicted pose 220, a viewpoint-synthesized image 225 in two-dimensional (2D) image space is generated via reprojection. This viewpoint-synthesized image 225 is compared with current frame 205 via a calculated photometric loss 235 (also referred to herein as a "photometric reprojection error"). This photometric loss 235 is, in some embodiments, an L2 (root-mean-squared error) loss.

In the embodiment of FIG. 2, sparse sonar data 240 corresponding spatially and temporally to current frame 205 is projected into 2D image space as a sparse set of sonar "pixels." Those sonar "pixels" are compared with the depth pixels of depth image 210 via the calculation of a sonar loss 245. As mentioned above, in some embodiments the sonar loss 245 is a L1 (absolute-error) loss. These sparse sonar "pixels" and the sonar loss 245 provide the weak supervision of the MDE network that teaches the MDE network to estimate metric scale in a scene along with depth.

Figure 3:
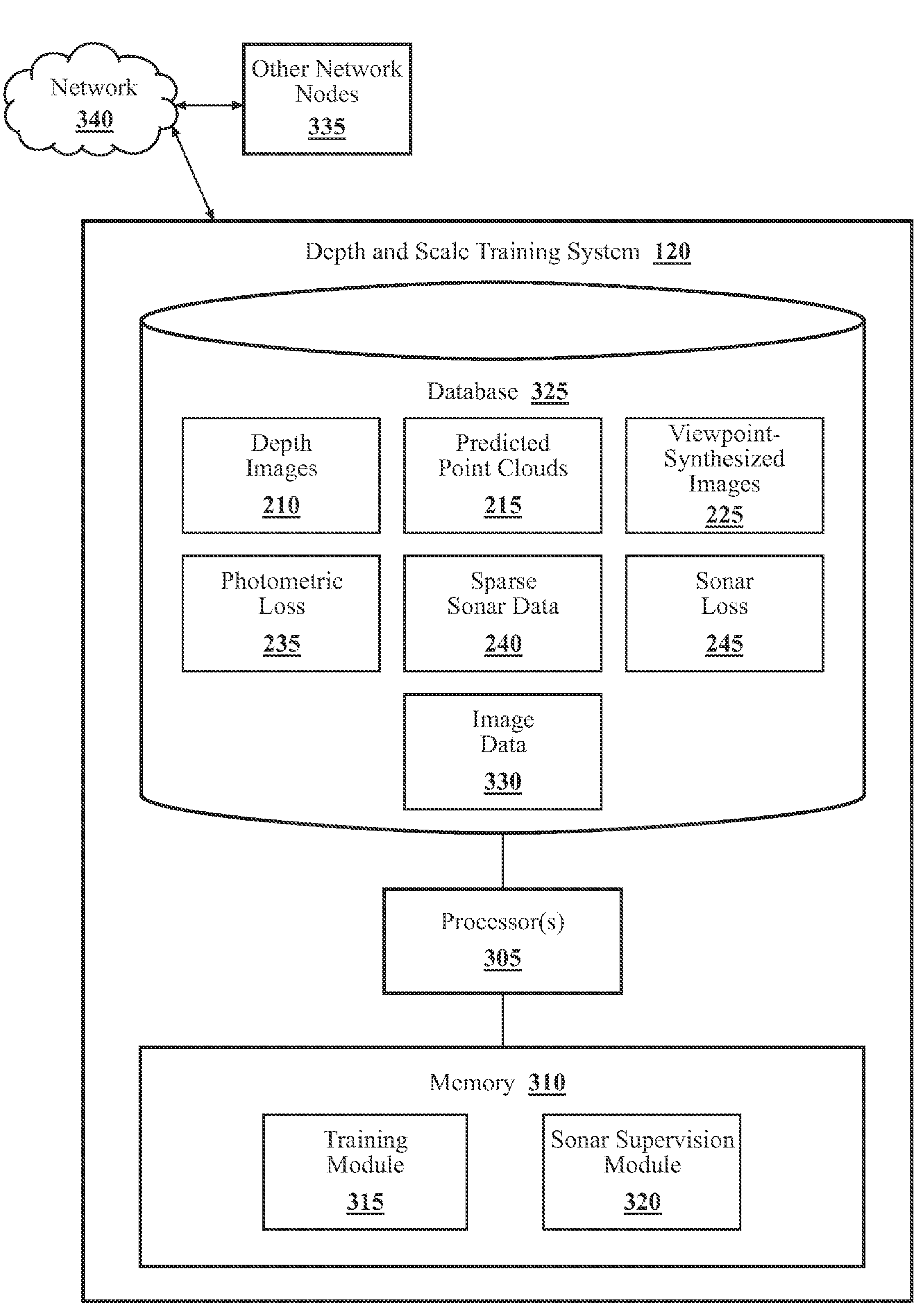
FIG. 3 is a block diagram of a depth and scale training system, in accordance with an illustrative embodiment of the invention.

FIG. 3 is a block diagram of a depth and scale training system 120, in accordance with an illustrative embodiment of the invention. In FIG. 3, depth and scale training system 120 includes one or more processors 305 to which a memory 310 is communicably coupled. The one or more processors 305 can be one or more dedicated processors of a robot or a computing system other than a robot (e.g., a server or workstation), or the one or more processors 305 can coincide with one or more processors in a robot that are used for other purposes (e.g., for control system 150 in the embodiments of FIGS. 1A and 1B). Memory 310 stores a training module 315 and a sonar supervision module 320. The memory 310 is a random-access memory (RAM), read-only memory (ROM), a hard-disk drive, a flash memory, or other suitable non-transitory memory for storing the modules 315 and 320. The modules 315 and 320 are, for example, machine-readable instructions that, when executed by the one or more processors 305, cause the one or more processors 305 to perform the various functions disclosed herein.

As shown in FIG. 3, depth and scale training system 120 can store various kinds of data in a database 325. For example, depth and scale training system 120 can store image data 330 (e.g., current frame 205 and adjacent frame 230 discussed above in connection with FIG. 2), depth images 210, predicted point clouds 215, viewpoint-synthesized images 225, sparse sonar data 240, photometric loss 235, and sonar loss 245. These data items are discussed in greater detail above in connection with FIG. 2.

As indicated in FIG. 3, depth and scale training system 120 can communicate with other network nodes 335 (e.g., other robots, cloud servers, infrastructure devices, mobile devices, etc.) via a network 340. In some embodiments, network 340 includes the Internet. In communicating with other network nodes 335, calibration initiation system 110 may use any of a variety of wired and wireless communication technologies such as Ethernet®, IEEE 802.11 (WiFi), cellular data (LTE, 5G, 6G, etc.), Bluetooth®, Bluetooth® Low Energy (Bluetooth® LE), and Dedicated Short-Range Communications (DSRC).

Training module 315 generally includes instructions that, when executed by the one or more processors 305, cause the one or more processors 305 to train a self-supervised monocular depth estimation (MDE) network 110 by minimizing a photometric reprojection error (photometric loss 235) between an original target image (current frame 205) of a scene and a viewpoint-synthesized image 225. This process, which involves multi-view reprojection, is discussed above in connection with FIG. 2.

Sonar supervision module 320 generally includes instructions that, when executed by the one or more processors 305, cause the one or more processors 305 to weakly supervise the training of the MDE network 110 by minimizing a loss (sonar loss 245) computed between a depth image 210 generated by the MDE network 110 and a set of sparse sonar data points (sparse sonar data 240) collected from the scene to teach the MDE network 110 to estimate metric scale in connection with controlling a robot. Weak sonar supervision is also discussed in greater detail above in connection with FIG. 2.

Figure 4:
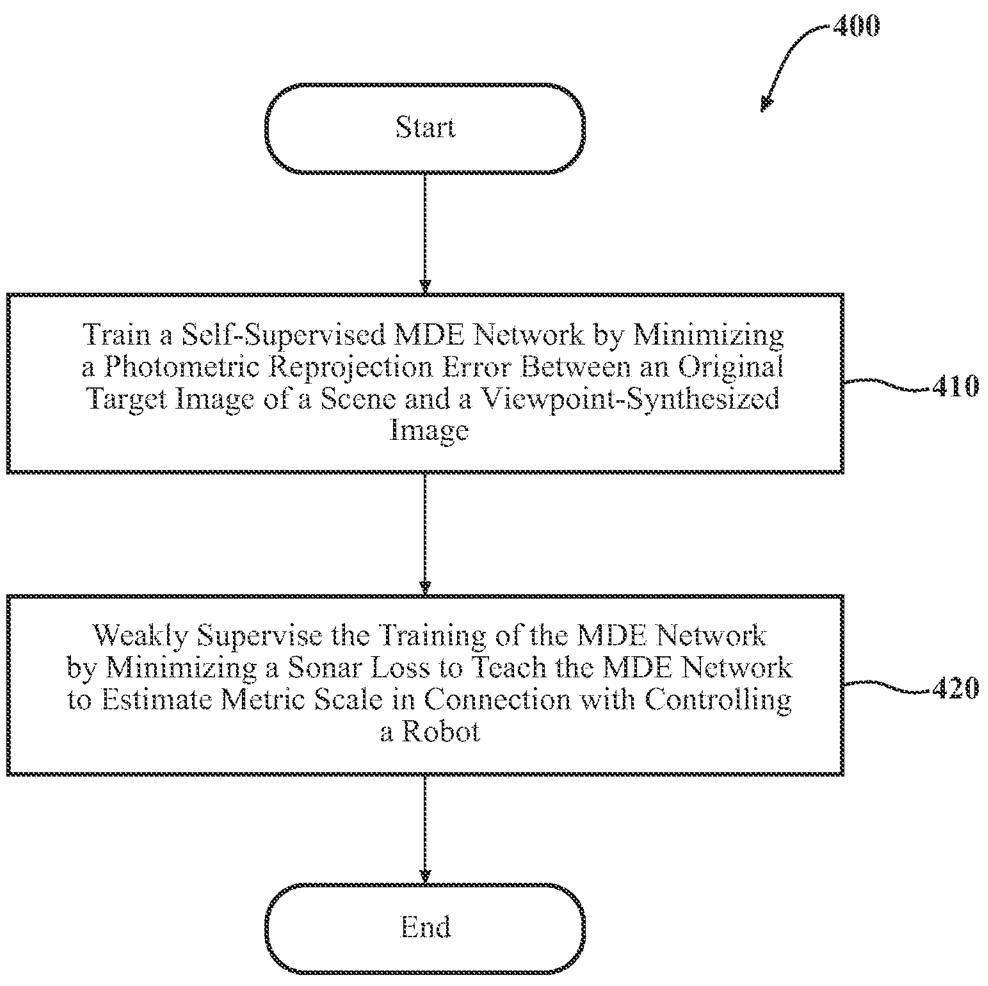
FIG. 4 is a flowchart of a method of training a depth estimator to be scale-aware using weak sonar supervision, in accordance with an illustrative embodiment of the invention.

FIG. 4 is a flowchart of a method 400 of training a depth estimator to be scale-aware using weak sonar supervision, in accordance with an illustrative embodiment of the invention. Method 400 will be discussed from the perspective of depth and scale training system 120 in FIG. 3. While method 400 is discussed in combination with depth and scale training system 120, it should be appreciated that method 400 is not limited to being implemented within depth and scale training system 120, but depth and scale training system 120 is instead one example of a system that may implement method 400.

At block 410, training module 315 trains a self-supervised MDE network by minimizing the photometric reprojection error (photometric loss 235) between an original target image (current frame 205) of a scene and a viewpoint-synthesized image 225. This process, which involves multi-view reprojection, is discussed in greater detail above in connection with FIG. 2.

At block 420, sonar supervision module 320 weakly supervises the training of the MDE network 110 by minimizing a loss (sonar loss 245) computed between a depth image 210 generated by the MDE network 110 and a set of sparse sonar data points (sparse sonar data 240) collected from the scene to teach the MDE network 110 to estimate metric scale in connection with controlling a robot. Weak sonar supervision is discussed in greater detail above in connection with FIG. 2.

As discussed above, in some embodiments, the set of sparse sonar data points corresponding to a given image frame (sparse sonar data 240) is obtained from a sonar sensor 130 that is integrated with the robot 100/105. In other embodiments, the robot does not include a sonar sensor or the robot's sonar sensor is not used, and the set of sparse sonar data points (240) corresponding to a given image frame 205 is transmitted to the robot 100/105 from a source (190) external to the robot 100/105, such as an EV charging station or an infrastructure device such as a RSU.

As also discussed above, in some embodiments, the MDE network 110 includes a U-Net neural network, a well-known neural-network architecture. In other embodiments, the MDE network 110 includes a transformer neural network.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " As used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for training a depth estimator to be scale-aware using weak sonar supervision, the system comprising:

a processor; and a memory storing machine-readable instructions that, when executed by the processor, cause the processor to:

train a self-supervised monocular depth estimation (MDE) network by minimizing a photometric reprojection error between an original target image of a scene and a viewpoint-synthesized image; and supervise weakly the training of the MDE network by minimizing a loss computed between a depth image generated by the MDE network and a set of sparse sonar data points collected from the scene to teach the MDE network to estimate metric scale in connection with controlling a robot, wherein the set of sparse sonar data points is transmitted to the robot from one of an electric-vehicle (EV) charging station external to the robot and an infrastructure device external to the robot.

2. The system of claim 1, wherein the set of sparse sonar data points is obtained from a sonar sensor integrated with the robot.

3. The system of claim 1, wherein the MDE network includes one of a U-Net neural network and a transformer neural network.

4. The system of claim 1, wherein the loss is an absolute-error (L1) loss.

5. The system of claim 1, wherein the robot is an autonomous vehicle.

6. The system of claim 1, wherein the robot is an indoor robot.

7. A non-transitory computer-readable medium for training a depth estimator to be scale-aware using weak sonar supervision and storing instructions that, when executed by a processor, cause the processor to:

train a self-supervised monocular depth estimation (MDE) network by minimizing a photometric reprojection error between an original target image of a scene and a viewpoint-synthesized image; and supervise weakly the training of the MDE network by minimizing a loss computed between a depth image generated by the MDE network and a set of sparse sonar data points collected from the scene to teach the MDE network to estimate metric scale in connection with controlling a robot, wherein the set of sparse sonar data points is transmitted to the robot from one of an electric-vehicle (EV) charging station external to the robot and an infrastructure device external to the robot.

8. The non-transitory computer-readable medium of claim 7, wherein the set of sparse sonar data points is obtained from a sonar sensor integrated with the robot.

9. The non-transitory computer-readable medium of claim 7, wherein the MDE network includes one of a U-Net neural network and a transformer neural network.

10. The non-transitory computer-readable medium of claim 7, wherein the robot is an autonomous vehicle.

11. The non-transitory computer-readable medium of claim 7, wherein the robot is an indoor robot.

12. A method, comprising:

training a self-supervised monocular depth estimation (MDE) network by minimizing a photometric reprojection error between an original target image of a scene and a viewpoint-synthesized image; and supervising weakly the training of the MDE network by minimizing a loss computed between a depth image generated by the MDE network and a set of sparse sonar data points collected from the scene to teach the MDE network to estimate metric scale in connection with controlling a robot, wherein the set of sparse sonar data points is transmitted to the robot from one of an electric-vehicle (EV) charging station external to the robot and an infrastructure device external to the robot.

13. The method of claim 12, wherein the set of sparse sonar data points is obtained from a sonar sensor integrated with the robot.

14. The method of claim 12, wherein the MDE network includes one of a U-Net neural network and a transformer neural network.

15. The method of claim 12, wherein the loss is an absolute-error (L1) loss.

16. The method of claim 12, wherein the robot is an autonomous vehicle.

17. The method of claim 12, wherein the robot is an indoor robot.

* * * * *